(12) United States Patent
Scheffe et al.

(10) Patent No.: US 12,534,675 B2
(45) Date of Patent: Jan. 27, 2026

(54) CONTINUOUS UTILIZATION OF INDUSTRIAL FLUE GAS EFFLUENT FOR THE THERMOCHEMICAL REFORMING OF METHANE

(71) Applicant: University of Florida Research Foundation, Inc., Gainesville, FL (US)

(72) Inventors: Jonathan Scheffe, Gainesville, FL (US); Juan Claudio Nino, Gainesville, FL (US); Helena Hagelin Weaver, Gainesville, FL (US)

(73) Assignee: University of Florida Foundation, INC., Gainesville, FL (US)

( * ) Notice: Subject to any disclaimer, the term of this patent is extended or adjusted under 35 U.S.C. 154(b) by 592 days.

(21) Appl. No.: 17/290,116

(22) PCT Filed: Oct. 30, 2019

(86) PCT No.: PCT/US2019/058743
§ 371 (c)(1),
(2) Date: Apr. 29, 2021

(87) PCT Pub. No.: WO2020/101890
PCT Pub. Date: May 22, 2020

(65) Prior Publication Data
US 2021/0395624 A1     Dec. 23, 2021

Related U.S. Application Data

(60) Provisional application No. 62/797,630, filed on Jan. 28, 2019, provisional application No. 62/760,487, filed on Nov. 13, 2018.

(51) Int. Cl.
C10J 1/20     (2006.01)
C07C 1/04     (2006.01)
C10K 3/02     (2006.01)

(52) U.S. Cl.
CPC .............. *C10J 1/20* (2013.01); *C07C 1/0485* (2013.01); *C10K 3/026* (2013.01)

(58) Field of Classification Search
CPC .......... C10J 1/20; C07C 1/0485; C10K 3/026; Y02E 60/36; C01B 3/06; C01B 3/36; C10G 2/32
See application file for complete search history.

(56) References Cited

U.S. PATENT DOCUMENTS

2007/0124997 A1   6/2007  Liu et al.
2014/0158030 A1*  6/2014  Jadhav ................ F23L 7/007
                                                    110/345

(Continued)

FOREIGN PATENT DOCUMENTS

CA    2719382 A1 * 10/2009    .......... B01J 19/0093
EP    3308851 A1 *  4/2018    ............... C07C 1/02

OTHER PUBLICATIONS

Welte et al. Ind. Eng. Chem. Res. 2017, 56, 37, 10300-10308 (Year: 2017).*

(Continued)

*Primary Examiner* — Sally A Merkling
*Assistant Examiner* — Jordan W Taylor
(74) *Attorney, Agent, or Firm* — Thomas | Horstemeyer LLP.

(57) ABSTRACT

Methods and systems of the present disclosure can function to capture flue gas and convert the flue gas to a synthesis gas, which can be further processed to other components such as liquid fuels. Aspects of the present disclosure provide for a process designed to capture flue gas from large scale (i.e. ~GW), fossil based power plants in a 24/7 continuous operation. In addition, the method and system can convert (Continued)

the flue gas to a synthesis gas (mainly carbon monoxide and hydrogen), which will be processed into high quality liquid fuels, like diesel.

16 Claims, 4 Drawing Sheets

(56) References Cited

U.S. PATENT DOCUMENTS

| | | | |
|---|---|---|---|
| 2015/0343416 A1* | 12/2015 | Fadhel | B01J 8/0055 252/186.1 |
| 2016/0296917 A1* | 10/2016 | Bordoloi | B01J 35/397 |
| 2017/0259240 A1 | 9/2017 | Fadhel et al. | |

OTHER PUBLICATIONS

Scheffe et al. Ind. Eng. Chem. Res. 2014, 53, 2175-2182 (Year: 2014).*
Tavasoli et al. Joule, 2018, 571-578 (Year: 2018).*
Fiuk et al. Catalysis Today, 2015, 257, 131-135 (Year: 2015).*
Hao et al. Chem. Mater. 2014, 26, 6073-6082 (Year: 2014).*
Wilkes, Thesis 1999 (Year: 1999).*
Zamar et al. Studies in Surface Science and Catalysis, 1996, 101, 1283-1292 (Year: 1996).*
Singh et al. Chem. Mater. 2010, 22, 762-768 (Year: 2010).*
Shumin et al. Chin J Catal, 2009, 30, 7, 685-689 (Year: 2009).*
Jasiwal et al. Journal of Power Sources 2012, 202, 78-84 (Year: 2012).*
Kaneko et al. Energy 2007, 32, 656-663 (Year: 2007).*
Le et al. Top Catal, 2017, 60, 714-720 (Year: 2017).*
Milanese et al. Energy, 2017, 134, 919-932 (Year: 2017).*
Song et al. Catalysis Today, 2004, 98, 463-484 (Year: 2004).*
Scheffe, Jonathan R., et al. "Kinetics and mechanism of solar-thermochemical $H_2$ production by oxidation of a cobalt ferrite-zirconia composite." Energy & Environmental Science 6.3 (2013): 963-973.
Coal Industry Advisory Board "Measuring and Reporting Efficiency Performance and $CO_2$ Emissions" Power Generation from Coal (2010).
Welte, Michael, et al. "Combined ceria reduction and methane reforming in a solar-driven particle-transport reactor." Industrial & engineering chemistry research 56.37 (2017): 10300-10308.
Wood, David A.; et al. "Gas-to-liquids (GTL): A review of an industry offering several routes for monetizing natural gas." Journal of Natural Gas Science and Engineering 9 (2012): 196-208.
Mehos, Mark, et al. On the path to SunShot-advancing concentrating solar power technology, performance, and dispatchability. No. NREL/TP-5500-65688 SAND-2016-2237 R. EERE Publication and Product Library, 2016.
Rostrup-Nielsen; et al. "Hydrogen and synthesis gas by steam -and $CO_2$ reforming." (2002): 65-139.
Pakhare, Devendra; et al. "A review of dry ($CO_2$) reforming of methane over noble metal catalysts." Chemical Society Reviews 43.22 (2014): 7813-7837.
York, Andrew PE; et al. "Brief overview of the partial oxidation of methane to synthesis gas." Topics in Catalysis 22.3 (2003): 345-358.
Wilhelm, D. J., et al. "Syngas production for gas-to-liquids applications: technologies, issues and outlook." Fuel processing technology 71.1-3 (2001): 139-148.
Pen, M. A.; et al. "New catalytic routes for syngas and hydrogen production." Applied Catalysis A: General 144.1-2 (1996): 7-57.
Enger, Bjørn Christian,; et al. "A review of catalytic partial oxidation of methane to synthesis gas with emphasis on reaction mechanisms over transition metal catalysts." Applied Catalysis A: General 346.1-2 (2008): 1-27.
Agrafiotis, Christos, et al. "Solar thermal reforming of methane feedstocks for hydrogen and syngas production—a review." Renewable and Sustainable Energy Reviews 29 (2014): 656-682.
Sheu, Elysia J.; et al. "A review of solar methane reforming systems." international journal of hydrogen energy 40.38 (2015): 12929-12955.
Krenzke, Peter T.; et al. "Solar fuels via chemical-looping reforming." Solar Energy 156 (2017): 48-72.
Dry, Mark E. "The fischer-tropsch process: 1950-2000." Catalysis today 71.3-4 (2002): 227-241.
Steinfeld, Aldo. "Solar thermochemical production of hydrogen—a review." Solar energy 78.5 (2005): 603-615.
Steinfeld, Aldo; et al. "Solar thermochemical process technology." Encyclopedia of physical science and technology 15.1 (2001): 237-56.
Panlener, R. J.; et al. "A thermodynamic study of nonstoichiometric cerium dioxide." Journal of Physics and Chemistry of Solids 36.11 (1975): 1213-1222.
Mogensen, Mogens; et al. "Physical, chemical and electrochemical properties of pure and doped ceria." Solid State Ionics 129.1-4 (2000): 63-94.
Chueh, William C.; et al. "A thermochemical study of ceria: exploiting an old material for new modes of energy conversion and $CO_2$ mitigation." Philosophical Transactions of the Royal Society A: Mathematical, Physical and Engineering Sciences 368.1923 (2010): 3269-3294.
Rhodes, Nathan R., et al. "Investigation of long term reactive stability of ceria for use in solar thermochemical cycles." Energy 89 (2015): 924-931.
Skorodumova, N. V., et al. "Quantum origin of the oxygen storage capability of ceria." Physical Review Letters 89.16 (2002): 166601.
Furler, Philipp, et al. "Solar thermochemical $CO_2$ splitting utilizing a reticulated porous ceria redox system." Energy & Fuels 26.11 (2012): 7051-7059.
Marxer, Daniel, et al. "Demonstration of the entire production chain to renewable kerosene via solar thermochemical splitting of $H_2O$ and $CO_2$." Energy & Fuels 29.5 (2015): 3241-3250.
Marxer, Daniel, et al. "Solar thermochemical splitting of $CO_2$ into separate streams of CO and $O_2$ with high selectivity, stability, conversion, and efficiency." Energy & Environmental Science 10.5 (2017): 1142-1149.
Diver, Richard B., et al. "Solar thermochemical water-splitting ferrite-cycle heat engines." Journal of Solar Energy Engineering 130.4 (2008).
Ermanoski, Ivan; et al. "A new reactor concept for efficient solar-thermochemical fuel production." Journal of Solar Energy Engineering 135.3 (2013).
Warren, Kent J., et al. "Theoretical and experimental investigation of solar methane reforming through the nonstoichiometric ceria redox cycle." Energy Technology 5.11 (2017): 2138-2149.
Warren, Kent J.; et al. "Kinetic insights into the reduction of ceria facilitated via the partial oxidation of methane." Materials today energy 9 (2018): 39-48.
Krenzke, Peter T.; et al. "Thermodynamic analysis of syngas production via the solar thermochemical cerium oxide redox cycle with methane-driven reduction." Energy & Fuels 28.6 (2014): 4088-4095.
Yurek, Gregory J.; et al. "The formation of two-phase layered scales on pure metals." Oxidation of Metals 8.5 (1974): 265-281.
Kodama, T., et al. "Stepwise production of CO-rich syngas and hydrogen via solar methane reforming by using a Ni (II)-ferrite redox system." Solar Energy 73.5 (2002): 363-374.
He, Feng, et al. "A hybrid solar-redox scheme for liquid fuel and hydrogen coproduction." Energy & Environmental Science 7.6 (2014): 2033-2042.
Takenaka, Sakae; et al. "Storage and supply of pure hydrogen from methane mediated by modified iron oxides." Energy & fuels 18.3 (2004): 820-829.
Takenaka, Sakae; et al. "Production of pure hydrogen from methane mediated by the redox of Ni -and Cr-added iron oxides." Journal of Catalysis 228.2 (2004): 405-416.
Scheffe, Jonathan R.; et al. "Oxygen exchange materials for solar thermochemical splitting of $H_2O$ and $CO_2$: a review." Materials Today 17.7 (2014): 341-348.

(56) References Cited

OTHER PUBLICATIONS

Chueh, William C.; et al. "Ceria as a Thermochemical Reaction Medium for Selectively Generating Syngas or Methane from H_2O and CO_2." ChemSusChem 2.8 (2009): 735-739.

Chueh, William C., et al. "High-flux solar-driven thermochemical dissociation of CO2 and H2O using nonstoichiometric ceria." Science 330.6012 (2010): 1797-1801.

Furler, Philipp; et al. "Syngas production by simultaneous splitting of H2O and CO 2 via ceria redox reactions in a high-temperature solar reactor." Energy & Environmental Science 5.3 (2012): 6098-6103.

Stechel, Ellen B.; et al. "Re-energizing CO2 to fuels with the sun: Issues of efficiency, scale, and economics." Journal of CO2 Utilization 1 (2013): 28-36.

Morgane Riviere; et al. "Oxycombustion Flue Gas Measurements from Coal Fired Plants: Analytical Challenges" Environmental Protection Agency (2015).

Ermanoski, Ivan, et al. "Design and construction of a cascading pressure reactor prototype for solar-thermochemical hydrogen production." AIP Conference Proceedings. vol. 1734. No. 1. AIP Publishing LLC, 2016.

Scheffe, Jonathan R.; et al. "Thermal reduction of ceria within an aerosol reactor for H2O and CO2 splitting." Industrial & Engineering Chemistry Research 53.6 (2014): 2175-2182.

Scheffe, Jonathan R., et al. "Synthesis, characterization, and thermochemical redox performance of Hf4+, Zr4+, and Sc3+ doped ceria for splitting CO2." The Journal of Physical Chemistry C 117.46 (2013): 24104-24114.

Takacs, Michael; et al. "Oxygen nonstoichiometry and thermodynamic characterization of Zr doped ceria in the 1573-1773 K temperature range." Physical Chemistry Chemical Physics 17.12 (2015): 7813-7822.

Hao, Yong; et al. "Ceria-Zirconia Solid Solutions (Ce1-x Zr x O2-d, x= 0.2) for Solar Thermochemical Water Splitting: A Thermodynamic Study." Chemistry of Materials 26.20 (2014): 6073-6082.

Kim, Jiyong, et al. "Methanol production from CO2 using solar-thermal energy: process development and techno-economic analysis." Energy & Environmental Science 4.9 (2011): 3122-3132.

Kim, Jiyong, et al. "Comparative analysis of environmental impact of S2P (Sunshine to Petrol) system for transportation fuel production." Applied energy 111 (2013): 1089-1098.

Welte, Michael, et al. "Experimental demonstration of the thermochemical reduction of ceria in a solar aerosol reactor." Industrial & engineering chemistry research 55.40 (2016): 10618-10625.

Siegel, Nathan P., et al. "Factors affecting the efficiency of solar driven metal oxide thermochemical cycles." Industrial & Engineering Chemistry Research 52.9 (2013): 3276-3286.

Trachtenberg, Michael C., et al. "Flue gas CO2 capture by means of a biomimetic facilitated transport membrane." Proceedings of the AIChE Spring Annual Meeting. 2007.

International Search Report and Written Opinion for PCT/US2019/058743 of Jan. 27, 2020.

Welte et al.;"Combined Ceria Reduction and Methane Reforming in a Solar-Driven Particle-Transport Reactor"; Ind. Eng. Chem. Res.; vol. 56 pp. 10300-10308; Published online Aug. 22, 2017 (Aug. 22, 2017); Abstract; Figure 1; and entire document.

Welte et al.;"Experimental Demonstration of the Thermochemical Reduction of Ceria in a Solar Aerosol Reactor", Ind. Eng. Chem. Res.; vol. 55 pp. 10618-10625; Published online Sep. 23, 2016 (Sep. 23, 2016) Entire document.

Pullar et al.; "A Review of Solar Thermochemical CO2 Splitting Using Ceria-Based Ceramics With Designed Morphologies and Microstructures", Frontiers in Chemistry; vol. 7, Article 601; Published Sep. 4, 2019 (Sep. 4, 2019).

* cited by examiner

FIG. 1

Prior art

CONTINUOUS UTILIZATION OF INDUSTRIAL FLUE GAS EFFLUENT FOR THE THERMOCHEMICAL REFORMING OF METHANE

CLAIM OF PRIORITY TO RELATED APPLICATION

This application is the 35 U.S.C. § 371 national stage of PCT application having serial number PCT/US2019/058743, filed on Oct. 30, 2019. This application also claims priority to U.S. provisional application entitled "CONTINUOUS UTILIZATION OF INDUSTRIAL FLUE GAS EFFLUENT FOR THE THERMOCHEMICAL REFORMING OF METHANE," having Ser. No. 62/760,487 filed on Nov. 13, 2018, and also this application claims priority to U.S. provisional application entitled "Continuous utilization of industrial flue gas effluent for the thermochemical reforming of methane" having Ser. No. 62/797,630, filed on Jan. 28, 2019 which are entirely incorporated herein by reference.

BACKGROUND

Global increases in natural gas reserves coupled with increasing liquid fuel prices have supported the emergence of methane-driven, gas-to-liquids (GTL) technologies. These processes typically utilize either $CO_2$ or $H_2O$ as feedstocks, both of which are found in flue gases from fossil fuel power plants. Utilizing industrial flue gases to produce liquid fuels may be a financially achievable while also reducing harmful gases emitted.

SUMMARY

Methods and systems of the present disclosure can function to capture flue gas and convert the flue gas to a synthesis gas, which can be further processed to other components such as liquid fuels.

The present disclosure provides for a method of continuously processing flue gas, comprising: a) introducing a flue gas comprising $CO_2$ to a material selected from a solid metal or an oxygen deficient metal oxide; b) forming a first gas mixture comprising CO by the reduction reaction of the flue gas with the material, wherein the material is oxidized to form an oxidized solid material; c) separating the first gas mixture from the oxidized solid material; d) introducing the oxidized solid material to a reducing environment; e) forming a second gas mixture by reducing the oxidized solid material to form the material selected from the solid metal or the oxygen deficient metal oxide; f) separating the second gas mixture from the reduced material; and g) go to step a).

The present disclosure provides for a system for processing flue gas, comprising: a first reactor comprising a flue gas and a material selected from a solid metal or an oxygen-deficient metal oxide, wherein the flue gas comprises $CO_2$, wherein the first reactor is configured to form a first mixture comprising CO by the oxidation reaction of the flue gas with the material, wherein the material is oxidized to form an oxidized solid; a first transport apparatus to move the oxidized solid oxide to a second reactor, wherein the first reactor and the second reactor are separate reactors; the second reactor comprises the oxidized solid oxide, wherein the second reactor is configured to reduce the oxidized solid oxide to the material and to form a second mixture comprising either CO and $H_2$, $O_2$ or $O_2$ mixed with inert gas; and a second transport apparatus to move the material to the first reactor.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 (top) illustrates a schematic of solar reactor utilized for the partial oxidation of methane to synthesis has over ceria. Particles were fed with gravity, reacted with $CH_4$ in the hot zone, and finally collected in a hopper at the exit following their reduction. FIG. 2 (bottom) illustrates the ceria mass flow rate average $\dot{m}_{CeO2}=0.13$ g s$^{-1}$ (left axis), and $CH_4$ inlet/outlet, $H_2$, CO, and $CO_2$ molar flow rates (right axis) as a function of time during a representative experimental run. The subscript 0 indicates the inlet condition. Experimental conditions: $T_{tube}=1302°$ C., $\delta_{final}=0.16$, $\dot{V}_{CH4/Ar}=2$ $L_N$ min$^{-1}$, co-current flow configuration.

FIG. 4 (top) illustrates the evolution of the mean reduction extent, $\delta_{av}$, over the first 8 cycles. Error bars correspond to 95% confidence intervals. Experimental conditions: $\dot{m}_{CeO_2}=50$ and 120 mg s$^{-1}$, $\dot{V}_{Ar}=0.5$ L min$^{-1}$, $p_{O_2, baseline}<5\times10^{-5}$ atm, $T_t=1873$ K. FIG. 4 (bottom) illustrates the agglomerate sizes obtained from corresponding primary particle size distributions obtained by laser scattering for cycles 1, 3, 5, and 7.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Methods and systems of the present disclosure can function to capture flue gas and convert the flue gas to a synthesis gas, which can be further processed to other components such as liquid fuels. Aspects of the present disclosure provide for a process designed to capture flue gas from large scale (i.e. ~GW), fossil based power plants in a 24/7 continuous operation. In addition, the methods and systems can convert the flue gas to a synthesis gas (mainly carbon monoxide and hydrogen), which will be processed into high quality liquid fuels, like diesel.

In an aspect, an integrated process where natural gas and/or solar energy (e.g. and/or other energy source such as an alternative energy source such as hydroelectric, wind, geothermal, and the like that can produce thermal energy) is used to reduce a material (e.g., a solid metal or an oxygen deficient metal oxide) that has a reaction enthalpy ($\Delta h_{rxn}$) greater than the magnitude of formation enthalpies of $H_2O$ ($\Delta h_{f,H2O}$) and $CO_2$ ($\Delta h_{f,CO2}$). The material can be comprised of a transition metal (e.g., or an oxide, alloy thereof, and the like), lanthanide material (e.g., or an oxide, allow thereof, and the like), for example a cerium based material (e.g., $CeO_2$-based material), or a combination thereof.

Figure 1:
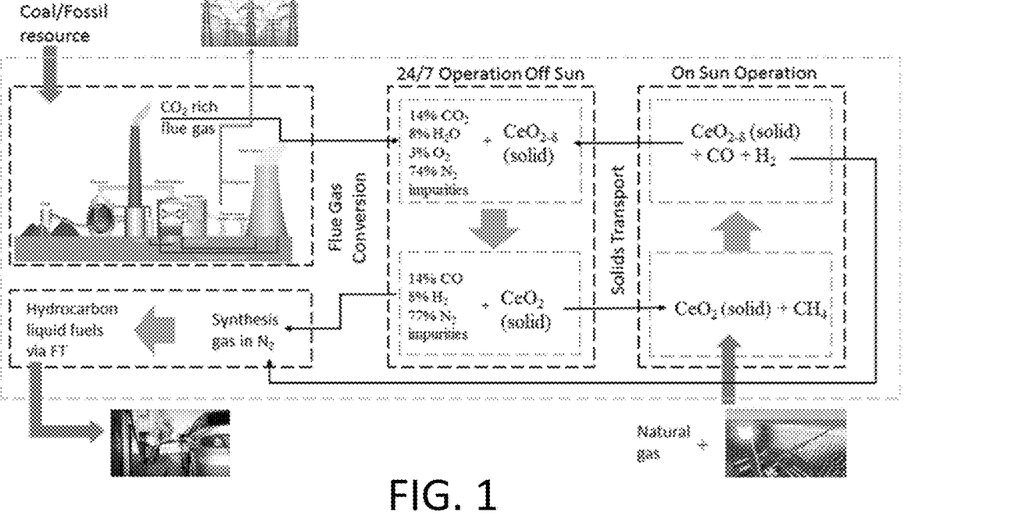
FIG. 1 illustrates a schematic for flue gas utilization coupled with solar driven methane reforming. Flue gases are converted to synthesis gases which are the precursors to fungible liquid fuels. A distinction of this process is the decoupling of the solar utilization (far right) and flue gas utilization (middle); this enables 24/7 utilization of the flue gases and eliminates any storage requirements.

Now having described the present disclosure in general, additional details will be described and then specific examples are provided. The method can include continuously processing flue gas, for example in a large scale fossil fuel power plant or other industrial process that consumes fossil fuels. The method can be a continuous cycle or nearly (e.g., minor interruptions of the cycle) continuous cycle or in a cycle that is not continuous. The method can be used in a non-cyclical manner. FIG. 1 in example 1 illustrates an embodiment of the cycle.

A starting point for the cycle is when a flue gas comprising $CO_2$ in introduced to a material, where the material can be a solid metal or an oxygen deficient metal oxide. The flue gas and the material can be mixed at a pressure of about 1 atm to 50 atm (e.g., about 1 atm to 10 atm, about 1 atm to 20 atm, about 10 atm to 20 atm, about 10 atm to 30 atm, about 30 atm to 50 atm, about 40 atm to 50 atm, about 1 atm to 5 atm about 1 atm to 2 atm, and the like), at a temperature of about ambient to about 1400° C. (about 25° C. to 500° C., about 25° C. to 200° C., about 500° C. to 1400° C., about 700° C. to 1400° C., about 500° C. to 1000° C., about 1000° C. to 1400° C., and the like), and/or for a time period of about a minute to 24 hours (e.g. about 1 hour to 6 hours, about 1 hour to 12 hours, about 6 hours to 12 hours, about 6 hours to 18 hours, about 12 hours to 18 hours, about 18 hours to 24 hours, and the like). After a time period, a first gas mixture comprising (or consisting of or alternatively consisting essentially of (e.g., the mixture include trace amounts of other gases or particles that do not detract in a material way from the method)) CO is formed by the reduction reaction of the flue gas with the material, where the material is oxidized to form an oxidized solid material. Next, the first gas mixture and the oxidized solid material are separated. Subsequently, the oxidized solid material is introduced to a reducing environment and a second gas mixture is formed by reducing the oxidized solid material to form the material (e.g., the solid metal or the oxygen deficient metal oxide). The second gas mixture is then separated from the reduced material and the entire process is repeated.

Specifically, the method includes: a) introducing a flue gas comprising $CO_2$ to a material selected from a solid metal or an oxygen deficient metal oxide; b) forming a first gas mixture comprising (e.g., consisting of or consisting essentially of) CO by the reduction reaction of the flue gas with the material, where the material is oxidized to form an oxidized solid material; c) separating the first gas mixture from the oxidized solid material; d) introducing the oxidized solid material to a reducing environment; e) forming a second gas mixture by reducing the oxidized solid material to form the material selected from the solid metal or the oxygen deficient metal oxide; f) separating the second gas mixture from the reduced material; and g) repeat step a)-e) for the time frame desired.

The reduction in the method includes using a heat source at sufficiently high temperature and/or sufficiently low partial pressure of oxygen ($pO_2$). The heat source can be solar radiation or another source that producing a high temperature of about 500 to 1600° C.

The low $pO_2$ can be achieved via vacuum pumping, rendering $O_2$ as or part of the second gas mixture. In another aspect, the low $pO_2$ can be achieved via inert gas, rendering $O_2$ and inert gas as or part of the second gas mixture. In yet another aspect, the low $pO_2$ can be achieved via a fuel source, rendering CO and $H_2$ as or part of the second gas mixture. In still another aspect, the low $pO_2$ is achieved via a fuel mixture containing methane, rendering CO and $H_2$ as or part of the second gas mixture. Also, a combination of each of these can be used to achieve the low $pO_2$.

In an embodiment, the material can have a partial molar enthalpy ($\Delta h_o$), or enthalpy of reaction with gaseous $O_2$ that is greater than the magnitude of formation enthalpies of $H_2O$ ($\Delta h_{f,H2O}$) and $CO_2$ ($\Delta h_{f,CO2}$). In general, the material can be a transition metal, a lanthanide material, or a combination thereof or an oxide thereof. In particular, the solid oxide can be $M(1)O_{2-\delta}$ and $\delta$ is $MO_2$ nonstoichiometry, where $0<\delta\leq0.5$. In an aspect, the solid oxide can be $M(1)_xM(2)_{1-x}O_{2-\delta}$ and $\delta$ is $MO_2$ nonstoichiometry, where x ranges from 0 to 0.5, and where $0<\delta\leq0.5$. In each instance above and as appropriate for the formula, M(1) can be Ce and M(2) can be Zr, Hf, or a combination thereof. In another aspect, the solid oxide can be $M(3)_xCe_{1-x}O_{2-\delta}$, where x ranges from 0 to 0.5, and $\delta$ is $CeO_2$ nonstoichiometry, where $0<\delta\leq0.5$. M(3) can be a transition metal or a combination thereof and can specifically be selected from La, Mn, Cr, Al, Sr, Co, Fe, or a combination thereof.

In an embodiment, steps b) and e) are conducted is separate reactors, where b) is conducted in a fluidized bed reactor and step e) is conducted in a solar drop-tube reactor (Scheffe, Jonathan R., Michael Welte, and Aldo Steinfeld. "Thermal reduction of ceria within an aerosol reactor for $H_2O$ and $CO_2$ splitting." *Industrial & Engineering Chemistry Research* 53.6 (2014): 2175-2182, Welte, Michael, et al. "Experimental demonstration of the thermochemical reduction of ceria in a solar aerosol reactor." *Industrial & engineering chemistry research* 55.40 (2016): 10618-10625, Welte, Michael, et al, "Combined ceria reduction and methane reforming in a solar-driven particle-transport reactor." *Industrial & engineering chemistry research* 56.37 (2017): 10300-10308), each of which are incorporated for in their entirety as it pertains to bed reactors and solar drop-tithe reactors.).

In an aspect, the first gas mixture and the second gas mixture are combined to form a third gas mixture. The first, second, or third gas mixture can each be further processed to form a hydrocarbon liquid fuel. The method can further include the step of processing the third mixture to form a hydrocarbon liquid fuel.

In a particular aspect, during on-sun (or other alternative energy source) operation and/or using natural gas, the thermal energy captured or generated can be used to reduce the ceria particles in a reactor (e.g., drop-tube reactor), which has been demonstrated on a 10 kW scale. Because particles are used, they may be collected, stored and later transported to a secondary reactor (e.g. fluidized bed) that is decoupled from the solar reactor and/or natural gas reactor (e.g., and/or other alternative energy source). There, particles will be reoxidized with flue gas components ($CO_2$, $H_2O$, $O_2$) to selectively generate the synthesis gas. Additional synthesis gas is generated from the reaction between the natural gas and the ceria particles. After reoxidation the ceria particles are returned to the solar reactor to begin the cycle again.

The present disclosure also includes a system for processing flue gas. The system can include a first reactor including the flue gas and the material. The flue gas can include $CO_2$. The first reactor can be configured to form a first mixture including CO by the oxidation reaction of the flue gas with the material. The first reactor can operate at a pressure of 1 atm to 50 atm, a temperature of ambient to 1600° C., and/or for a time frame of up to 24 hours. The material can be oxidized to form an oxidized solid in the first reactor. The system can include a first transport apparatus to move the oxidized solid oxide to a second reactor, where the first reactor and the second reactor are separate reactors. The first transport apparatus can include an elevator hopper, transporting fluidized bed, etc. The system also includes the second reactor that includes the oxidized solid oxide, where the second reactor is configured to reduce the oxidized solid oxide to the material and to form a second mixture including either CO and $H_2$, $O_2$ or $O_2$ mixed with inert gas. The system can also include a second transport apparatus (optionally the first and second transport apparatus are the same) to move the material to the first reactor. The second transport apparatus can include an elevator hopper, transporting fluidized bed, etc. The second reactor can operate at a pressure of vacuum ($10^{-7}$ atm) to 1 atm, a temperature of 600 to 1800° C., and/or for a time frame of up to 8 hours.

Optionally and in addition, the system can include a third reactor that is in gaseous communication (e.g., tubing, pumps, and the like) with the first reactor, the second reactor, or both. The third reactor is configured to receive the first mixture, the second mixture, or both.

In an aspect, the first reactor can be a fluidized bed reactor (Milanese, Marco, et al. "Multi-parameter optimization of double-loop fluidized bed solar reactor for thermochemical fuel production." Energy 134 (2017): 919-932, Bellan, Selvan, et al. "Heat transfer and particulate flow analysis of a 30 kW directly irradiated solar fluidized bed reactor for thermochemical cycling." Chemical Engineering Science (2018).), trickle bed reactor (Kruesi, Michael, et al. "Analysis of solar-driven gasification of biochar trickling through an interconnected porous structure." AIChE Journal 61.3 (2015): 867-879.), moving bed reactor (Henley, John P., et al. "Moving bed process for carbothermally synthesizing non-oxide ceramic powders." U.S. Pat. No. 5,607,297. 4 Mar. 1997.) or conveyor type reactor (Biswas, Akash, and Anthony H. McDaniel. High Efficiency Solar Thermochemical Reactor for Hydrogen Production. No. SAND2016-7117D. Sandia National Lab.(SNL-CA), Livermore, CA (United States), 2016.), each of which is incorporated in its entirely as it pertains to bed reactors.

In an aspect, the second reactor can be a solar drop-tube reactor (Scheffe, Jonathan R.. Michael Welte, and Aldo Steinfeld. "Thermal reduction of ceria within an aerosol reactor for $H_2O$ and $CO_2$ splitting." *Industrial & Engineering Chemistry Research* 53.6 (2014): 2175-2182, Welte, Michael, et al. "Experimental demonstration of the thermochemical reduction of ceria in a solar aerosol reactor." *Industrial & engineering chemistry research* 55.40 (2016): 10618-10625, Welte, Michael, et al. "Combined ceria reduction and methane reforming in a solar-driven particle-transport reactor." *Industrial & engineering chemistry research* 56.37 (2017): 10300-10308), a fluidized bed reactor (Milanese, Marco, et al. "Multi-parameter optimization of double-loop fluidized bed solar reactor for thermochemical fuel production." Energy 134 (2017): 919-932, Bellan, Selvan, et al. "Heat transfer and particulate flow analysis of a 30 kW directly irradiated solar fluidized bed reactor for thermochemical cycling." Chemical Engineering Science (2018).), trickle bed reactor (Kruesi, Michael, et al. "Analysis of solar-driven gasification of biochar trickling through an interconnected porous structure." AIChE Journal 61.3 (2015): 867-879.), moving bed reactor (Henley, John P., et al. "Moving bed process for carbothermally synthesizing nonoxide ceramic powders." U.S. Pat. No. 5,607,297. 4 Mar. 1997.) or conveyor type reactor (Biswas, Akash, and Anthony H. McDaniel. High Efficiency Solar Thermochemical Reactor for Hydrogen Production. No. SAND2016-7117D. Sandia National Lab.(SNL-CA), Livermore, CA (United States), 2016.), each of which is incorporated in its entirely as it pertains solar drop-tube reactors.

The following clauses provide additional description of embodiments of the present disclosure.

Clause 1. A method of continuously processing flue gas, comprising (or consisting of or consisting essentially of):
  a) introducing a flue gas comprising $CO_2$ to a material selected from a solid metal or an oxygen deficient metal oxide;
  b) forming a first gas mixture comprising CO by the reduction reaction of the flue gas with the material, wherein the material is oxidized to form an oxidized solid material;
  c) separating the first gas mixture from the oxidized solid material;
  d) introducing the oxidized solid material to a reducing environment;
  e) forming a second gas mixture by reducing the oxidized solid material to form the material selected from the solid metal or the oxygen deficient metal oxide;
  f) separating the second gas mixture from the reduced material; and
  g) go to step a).

Clause 2. The method of clause 1, wherein reduction includes using a heat source at sufficiently high temperature and sufficiently low partial pressure of oxygen ($pO_2$).

Clause 3. The method of clause 2, wherein the heat source is solar radiation.

Clause 4. The method of clause 2, wherein the low $pO_2$ is achieved via vacuum pumping, rendering the second gas mixture as comprising (or consisting of or consisting essentially of) $O_2$.

Clause 5. The method of clause 2, wherein the low $pO_2$ is achieved via an inert gas, rendering the second gas mixture comprising (or consisting of or consisting essentially of) $O_2$ and the inert gas.

Clause 6. The method of clause 2, wherein the low $pO_2$ is achieved via a fuel source, rendering second gas mixture as comprising (or consisting of or consisting essentially of) CO and $H_2$.

Clause 7. The method of clause 2, wherein the low $pO_2$ is achieved via a fuel mixture containing methane, rendering the second gas mixture as comprising (or consisting of or consisting essentially of) CO and $H_2$.

Clause 8. The method of any of the preceding clauses, wherein the material has partial molar enthalpy ($\Delta h_o$), or enthalpy of reaction with gaseous $O_2$ that is greater than the magnitude of formation enthalpies of $H_2O$ ($\Delta h_{f,H_2O}$) and $CO_2$ ($\Delta h_{f,CO_2}$).

Clause 9. The method of any of the preceding clauses, wherein the solid oxide is $M(1)O_{2-\delta}$ and $\delta$ is $MO_2$ nonstoichiometry, wherein $0<\delta\leq0.5$.

Clause 10. The method of clause 9, wherein M(1) is Ce.

Clause 11. The method of any of the preceding clauses, wherein the solid oxide is $M(1)_xM(2)_{1-x}O_{2-\delta}$ and $\delta$ is $MO_2$ nonstoichiometry, wherein x ranges from 0 to 0.5, wherein $0<\delta\leq2$.

Clause 12. The method of clause 11, wherein M(1) is Ce and M(2) is Zr, Hf or a combination thereof.

Clause 13 The method of any of the preceding clauses, wherein the solid oxide is $M(3)_xCe_{1-x}O_{2-\delta}$, wherein x ranges from 0 to 0.5, and $\delta$ is $CeO_2$ nonstoichiometry, wherein $0<\delta\leq2$.

Clause 14. The method of clause 13, wherein M(3) is a transition metal or a combination thereof.

Clause 15. The method of clause 13, wherein the M(3) is selected from La, Mn, Cr, Al, Sr, Co, Fe, or a combination thereof.

Clause 16. The method of any of the preceding clauses, wherein the material is selected from a transition metal, lanthanide material, or a combination thereof.

Clause 17. The method of any of the preceding clauses, wherein steps b) and e) are conducted is separate reactors.

Clause 18. The method of clause 17, wherein step b) is conducted in a fluidized bed reactor.

Clause 19. The method of clause 17, wherein step e) is conducted in a solar drop-tube reactor.

Clause 20. The method of any of the preceding clauses, wherein the first gas mixture and the second gas mixture are combined to form a third gas mixture.

Clause 21. The method of any of the preceding clauses, wherein the first, second or third gas mixture is further processed to form a hydrocarbon liquid fuel.

Clause 22. The method of clause 11, further comprising: processing the third mixture to form a hydrocarbon liquid fuel.

Clause 23. A system for processing flue gas, comprising (or consisting of or consisting essentially of):
  a first reactor comprising a flue gas and a material selected from a solid metal or an oxygen-deficient metal oxide, wherein the flue gas comprises $CO_2$, wherein the first reactor is configured to form a first mixture comprising CO by the oxidation reaction of the flue gas with the material, wherein the material is oxidized to form an oxidized solid;
  a first transport apparatus to move the oxidized solid oxide to a second reactor, wherein the first reactor and the second reactor are separate reactors;
  the second reactor comprises the oxidized solid oxide, wherein the second reactor is configured to reduce the oxidized solid oxide to the material and to form a second mixture comprising either CO and $H_2$, $O_2$ or $O_2$ mixed with inert gas; and
  a second transport apparatus to move the material to the first reactor.

Clause 24. The system of clause 23, further comprising: a third reactor in gaseous communication with the first reactor, the second reactor, or both, wherein the third reactor is configured to receive the first mixture, the second mixture, or both.

Clause 25. The system of any of the preceding clauses, wherein first reactor is a fluidized bed reactor.

Clause 26. The system of any of the preceding clauses, wherein second reactor is a solar drop-tube reactor.

Clause 267. The system of any of the preceding clauses, wherein the material is described in clauses 9 to 16.

Clause 28. The system of any of the preceding clauses, wherein the system is configured to operate under the conditions provided for in clauses 2 to 8.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

This example aims to develop technology capable of utilizing flue gas from large scale (i.e. ~GW), fossil based power plants[1], to produce synthesis gas, a precursor to drop-in liquid fuels. We propose to do this via integration with a methane reformation driven redox cycle powered by solar energy, where the solar step and flue gas utilization step are separated in both space and time. This is vitally important for 24/7 operation and utilization of flue gas because at the industrial scales at which it is generated, storage is not a viable option.

A schematic of the process is shown in FIG. 1. The on-sun, endothermic step of this process (far right side) is the partial oxidation of methane over ceria based particles in a drop-tube reactor, like we have demonstrated prior at the 10 kW scale[2]. Because particles are used, they may be collected and transported to a secondary reactor (e.g. fluidized bed) that is decoupled from the solar reactor. There, they will be oxidized in an exothermic reaction with flue gas components ($CO_2$, $H_2O$, $O_2$) to selectively generate $CO/H_2$ in $N_2$ (and heat to drive the process) and then returned to the solar reforming reactor to begin the cycle again. At the same time this process affords the economical utilization and transformation of solar energy and methane or natural gas to a valuable synthesis gas that can be further converted to a high quality, drop-in, diesel fuel and other added value chemicals that can be stored and transported.

Industrial syngas production through these means is primarily governed by two objectives: high methane conversion and appropriate product composition.[5] Today, catalytic steam methane reforming (SMR) is the most prominent technique and is characterized by the endothermic conversion over metal (generally nickel-based) catalysts. To increase CO selectivity and enforce appropriate $H_2/CO$ ratios for Fischer-Tropsch synthesis (FTS), researchers have also investigated the dry reformation of methane (DRM), which leverages sequestered $CO_2$ and $CH_4$ to produce syngas. Application is limited in practice however, due to a highly negative thermodynamic potential for coke formation and simultaneous presence of $H_2$ and $CO_2$ in the product stream leading, by the reverse water-gas shift reaction, to product recombination.[6] Since SMR and DMR are endothermic, current industrial practices generally supply the required process heat through combusting a portion of the methane feedstock. In the partial oxidation of methane (POM), $CH_4$ is exposed to a less than stoichiometric amount of $O_2$ that inhibits complete combustion to $H_2O$ and $CO_2$.[7] Although syngas ratios are sufficient for FTS, disadvantages associated with conventional POM include a significant cost for pure $O_2$ from air separation[8], safety concerns with co-feeding $CH_4$ and $O_2$ under explosive conditions[9], and catalyst deactivation through carbon deposition and/or temperature degradation[10]. These concerns, however, have not deterred recent commercialization of this technology (i.e., conventional POM coupled with FTS).

Noting the prominence of GTL technologies in industrial fuel production, development of more sustainable approaches towards syngas production has motivated several research endeavors.[11-13] Sunlight, once concentrated, can deliver sustainable process heat to drive high temperature thermochemical reactions. Of these reactions, $H_2O$ and $CO_2$ splitting have been studied extensively for the production of syngas (a mixture of $H_2$ and CO).[14] Depending on the $H_2/CO$ ratio, well documented catalytic pathways like FTS can convert syngas into a variety of hydrocarbon liquid fuels (e.g., diesel and jet fuel) at a higher quality than if derived through crude oil refinement.[15] Direct solar thermolysis of $H_2O/CO_2$ requires operating temperatures that exceed 2200° C., rendering the process infeasible.[16] Therefore, typical solar thermal $H_2O/CO_2$ splitting schemes employ metal oxides in a reduction-oxidation (redox) cycle to bisect the desired reaction and lower overall operating temperatures. Ceria ($CeO_{2-\delta}$) has emerged as a candidate oxygen-exchange material because it maintains a stable cubic fluorite structure for relatively large changes in oxygen stoichiometry[17, 18], demonstrates remarkable stability through extensive thermal cycling[19, 20], exhibits fast rates of oxygen-ion diffusion[19], and can reversibly shift between oxidation states[21]. Several experimental demonstrations of solar reactors utilizing ceria have been conducted; to date, solar-to-fuel conversion efficiencies ($\eta_{solar-to-fuel}$) have yet to eclipse 6%.[22-24] These relatively low efficiencies are largely attributed to the temperature disparity between the reduction (T>1450° C.) and oxidation (T<1000° C.) regimes.[24] This results in substantial sensible heat losses that can only be abated with the inclusion of efficient solid-solid heat recuperation between each regime, as proposed in Sandia National Laboratory's CR5[25] and elevating-particle reactor concepts[26].

Recently, we and others have demonstrated the promise of reforming methane via solar driven ceria based redox cycles.[2, 13, 27-29] Compared to the state of the art solar thermochemical cycles that have limited efficiencies because large temperature swings and extreme operating temperatures, this process operates at much lower temperatures (T<1000° C.) where traditional reactor materials may be utilized. Further, because both steps are operated at the same temperature, sensible heating losses are minimized. Ultimately, solar conversion efficiencies greater than 40% are realistic; we have already demonstrated ~10%-12% efficiency as proof of concept without any reactor optimization.[27, 2] Compared to iron oxide based materials that were most commonly used in prior studies, ceria based materials offer a plethora of advantages related to morphological stability, rapid kinetics and more favourable thermodynamics.[30-34]

Using ceria, this cycle proceeds in two distinct steps. The first is the endothermic and solar driven oxidation of methane over ceria to produce synthesis gas. In this step, ceria is reduced and oxygen is released from its bulk, the extent of which is characterized by its nonstoichiometry, δ.

Ceria, once reduced, is then exposed to either $H_2O$ or $CO_2$ and is re-oxidized, resulting in further synthesis gas production and the cycle is then repeated. It is important to note that the oxidation with $H_2O$ and $CO_2$ are both ubiquitously known to be completely selective to $H_2$ and CO, respectively.

Once reduced, the oxidation of ceria is well known to be thermodynamically and kinetically favourable over a large range of temperatures for the splitting of $CO_2$ and $H_2O$[19, 35], and an even larger range for oxidation with percentage levels of $O_2$[36]. Further, the splitting reactions are completely selective to CO and $H_2$ formation, unless selective catalysts are employed on the surface[22, 37-39]. In general, the oxidation of ceria is typically studied under conditions with only a single reactant (i.e. $CO_2$ or $H_2O$ or $O_2$), and there are only a few select studies that have investigated the impact of co-feeding reactants. For example, Furler et al. co-fed different ratios of $CO_2$ and $H_2O$ to determine the impact on the outlet $CO/H_2$ compositions, but this was very specific to the reactor utilized in that study[40].

There are serval unique factors that make such a cycle ideal for utilization of flue gas from fossil-based power plants. First, it is highly scalable and thus capable of matching the demands required from megawatt and gigawatt sized power plants that are emitting vast quantities of flue gases[1, 41]. Secondly, because the process operates in two distinct steps, the solar driven step and flue gas utilization step may be separated in both space and time if particles are transported. This means that although sunlight may only be used intermittently, flue gas can be utilized continuously (24/7) which eliminates the need for $CO_2$ storage. Further, the oxidation step is extremely flexible in the sense that the selectivity to CO and $H_2$ is 100%[22, 24, 39], and residual oxygen left from incomplete combustion will simply be consumed by the ceria to oxidize it further. Thus, ceria is capable of being integrated with a range of different types of flue gas emissions (natural gas, coal, etc.) and only the finer details of reaction kinetics in the presence of different gas compositions will have to be studied. The influence of impurities on the process such as $NO_x$, $SO_2$ and particulates[42] are not well understood.

Typically, these cycles are operated in either batch mode or continuous mode. In batch mode the solid reactants are stationary and enclosed in a cavity receiver; gaseous reactants and the solar input change with time depending on whether the reduction or oxidation step is being performed[22, 24, 39]. In continuous mode, particles are cycled between separate reduction and oxidation reactors where the thermal input and gaseous reactants remain constant[2, 26, 43, 44]. We have demonstrated the viability of both process in our lab[2, 27], but again for utilization of flue gas 24/7 the latter approach is what we propose to do here.

Stechel et al. have shown that the production of solar fuels via thermochemical routes offers the potential to produce 75 million barrels of oil per day (5.3 TW) given a high enough solar to fuel conversion efficiency (10% for the entire system efficiency) to produce $3/gasoline gallon equivalent (gge)[41]. This is largely in line with other economic studies of similar processes[49, 50]. This assumes a cost of $CO_2$ from concentrated sources of $39 to $80 per metric ton ($0.039-0.080/kg) which results in a cost contribution from $CO_2$ of less than $0.35-0.71/gge[41]. This is minimal compared to the cost contribution of $CO_2$ from direct air capture of about $1.80/gge; however, in the latter case there is the potential for a net carbon neutral scenario, whereas for $CO_2$ from point sources, the carbon is effectively utilized twice before being emitted to the atmosphere. Kim et al. has investigated the environmental impact for solar derived fuels that utilize $CO_2$ from flue gases and determined that with the current vehicle fleet in a sample city (Victorville, California), 3.6 Mt $CO_2$-eq and 77% of the total regional emissions could be mitigated.[50]

Figure 2:
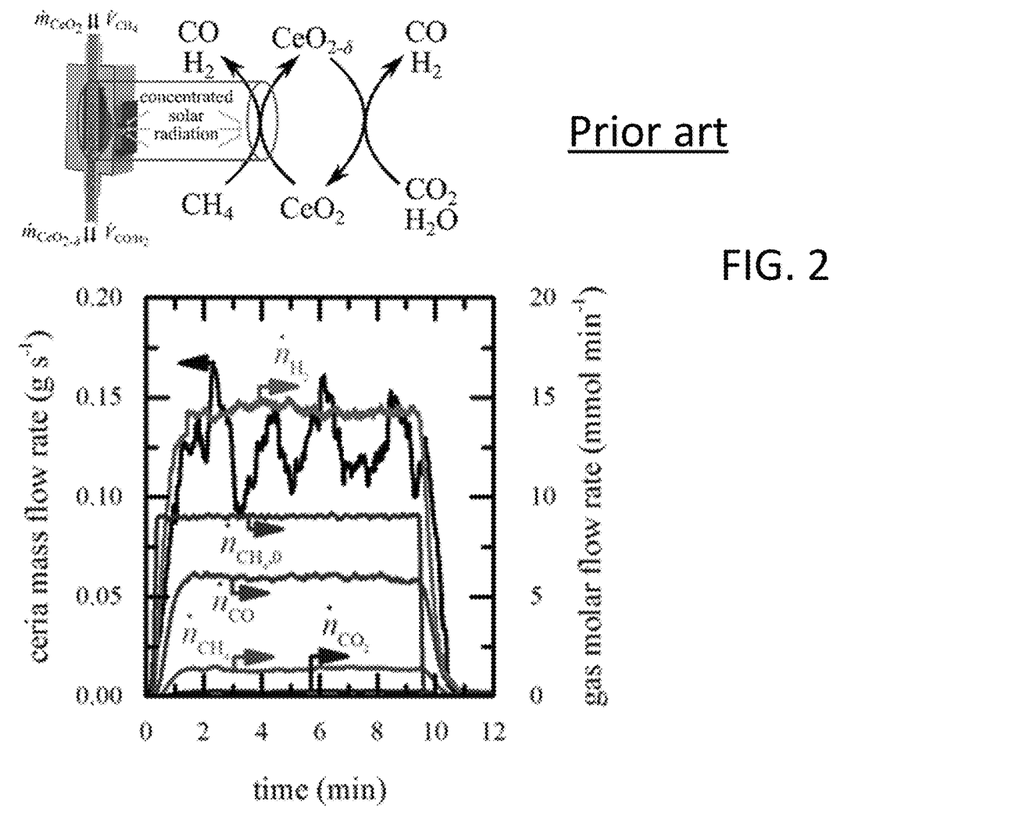

Recently we demonstrated the simultaneous reduction of ceria and partial oxidation of methane in a drop tube reactor, shown below in FIG. 2. The reactor was driven by a 2 $kW_{th}$ solar simulator at 2264 suns peak flux (1 sun=1 kW m$^{-2}$) that served as the heat source. Particles were gravity fed into the reactor using a particle feeder where they were subsequently heated and reacted with $CH_4$ that was traveling either co-currently or con-currently to the particle flow. Methane conversions of 89% were achieved for particle residence times as short as 1 s and $\eta_{solar-to-fuel}$ reached 12%. The syngas produced had a $H_2:CO$ molar ratio of 2, and its calorific value was solar-upgraded by 24% over that of the $CH_4$ reformed.

Figure 3:
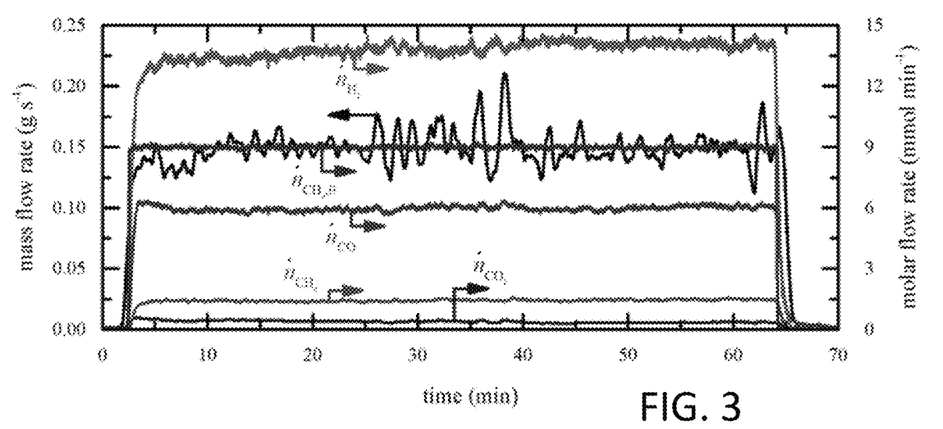
FIG. 3 illustrates the continuous syngas production for over 60 min with stable outlet gas composition. Experimental conditions: $T_{tube}=1291°$ C., $\delta=0.15$, $\dot{V}_{CH4/Ar}=2$ $L_N$ min$^{-1}$, $x_{CH_4,0}=0.1$, mean $\dot{m}_{CeO2}=0.15$ g s$^{-1}$ ($\dot{n}_{CeO2}=53.7$ mmol min$^{-1}$), co-current flow configuration.

Extended reaction times were investigated in order to assess the stability of the system. FIG. 3 shows continuous syngas production for an experimental run over 60 min with co-current flow configuration and for $T_{tube}$=1291° C., $\dot{V}_{CH4/Ar}$=2 $L_N$ min$^{-1}$, $x_{CH_4,0}$=0.1 and mean $\dot{m}_{CeO2}$=0.15 g s$^{-1}$. Shortly after the particle feeder and the inlet gas flow were initiated and despite the fluctuation in $\dot{m}_{CeO2}$, the CO and $H_2$ flow rates reached steady-state conditions at about 6 mmol min$^{-1}$ and 13.7 mmol min$^{-1}$, respectively, resulting in a $H_2:CO$ ratio of 2.3. The deviation from 2 is due to trace amounts of $CO_2$ production ($x_{CO_2}$=0.015) and carbon deposition ($x_C$=0.029). For this run, methane conversion was 0.85 and $\eta_{solar-to-fuel}$=8.3%. No evidence of a reaction between ceria particles and the $Al_2O_3$ tube was observed. A very small amount of carbon deposition was observed but did not exceed $x_C$=0.029. This was not observed in our prior studies with batch type systems[27, 28] and although the reason for this is not entirely clear, we hypothesize that this may be in part due to quenching of the particles to lower temperatures where methane cracking is favourable[27]. Regardless we expect that any carbon resulting from cracking will easily be oxidized during the subsequent oxidation step to form more synthesis gas[27]. Carbon deposition was also observed on the $Al_2O_3$ reaction tubes which could be detrimental if allowed to accumulate over time but this may be remedied by delivering oxygen through the reaction tube intermittently.

Figure 4:
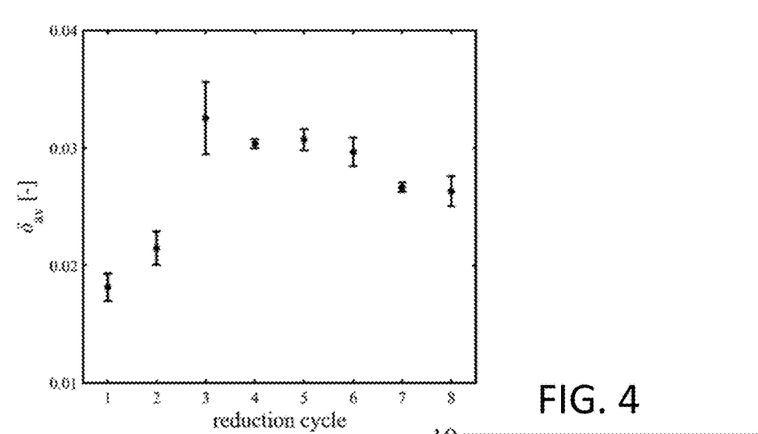

In this study, the effect of repeated cycling on particle attrition and reactivity was not investigated. We have investigated the effect of repetitive cycling on ceria particles that were subjected to higher temperatures in the same reaction tube where only thermal energy was used (i.e. no methane)[51]. There, we observed some particle agglomeration in the reaction zone and subsequent particle sintering that led to larger particle sizes and increased reaction extents over the first four cycles, as seen in FIG. 4. However, as the particles were cycled further, this process became less severe and ultimately after 8 cycles further increases in particle sizes and changes in reaction extents were not observed. Assessing the impact of repetitive cycling on particle attrition and reactivity during methane oxidation and flue gas reduction will be a focus of this proposal.

Figure 5:
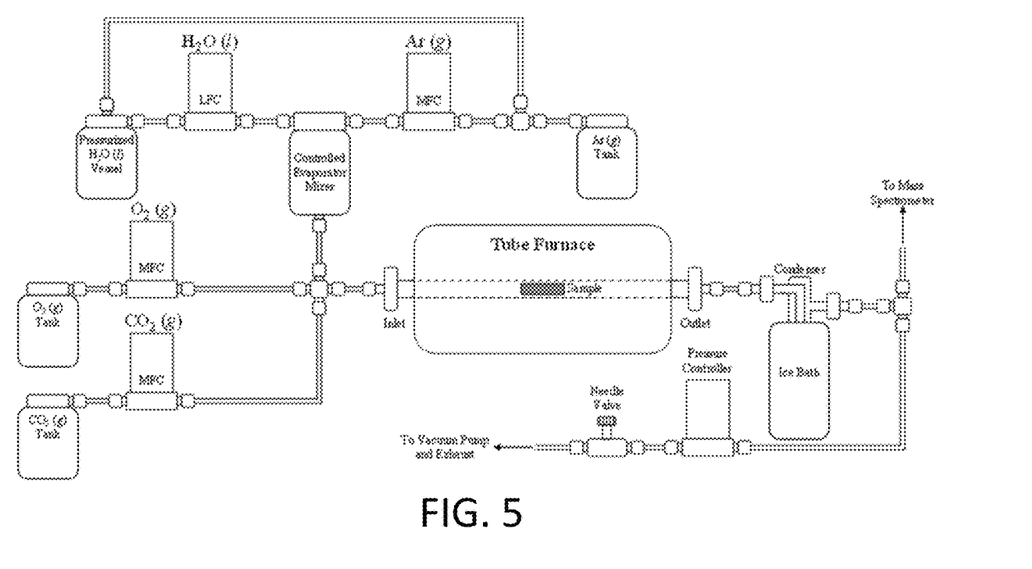
FIG. 5 illustrates a schematic of tubular reactor developed to study heterogeneous reaction kinetics with $CO_2/O_2/H_2O$.

We have recently developed a system specifically designed for studying the kinetics of gas-solid reactions using a variety of reactive gases, including $H_2O$, $CO_2$ and $O_2$. A simple schematic of the reactor system is shown in FIG. 5 below. The sample temperature is controlled via a Carbolite STF 16/180 high-temperature tube furnace capable of achieving temperatures up to 1873 K. An MKS Type 640B absolute pressure controller coupled with an Edwards E2M0.7 rotary vane pump allows for examination under $p_{tot}$ ranging from vacuum to ambient. Gaseous $H_2O$ (ranging from 0.18 to 9 g/hr) is metered into the reactor's work tube via a vapor delivery system consisting of a Bronkhorst Controlled Evaporator Mixer (CEM) and LIQUI-FLOW liquid flow controller (LFC) and an MKS GE50A mass flow controller (MFC). All reactor plumbing downstream of the vapor delivery system is wrapped with flexible electric heating tape and basalt fabric insulation to prevent condensation of the vapor mixture. Two additional MKS GE50A MFC's are used to deliver other desired reactant gases (e.g. $CO_2/O_2$). After passing through the work tube, all gases travel through a vacuum trap submerged in an ice bath before being sampled by a Stanford Research Systems QMS series residual gas analyzer.

Figure 6:
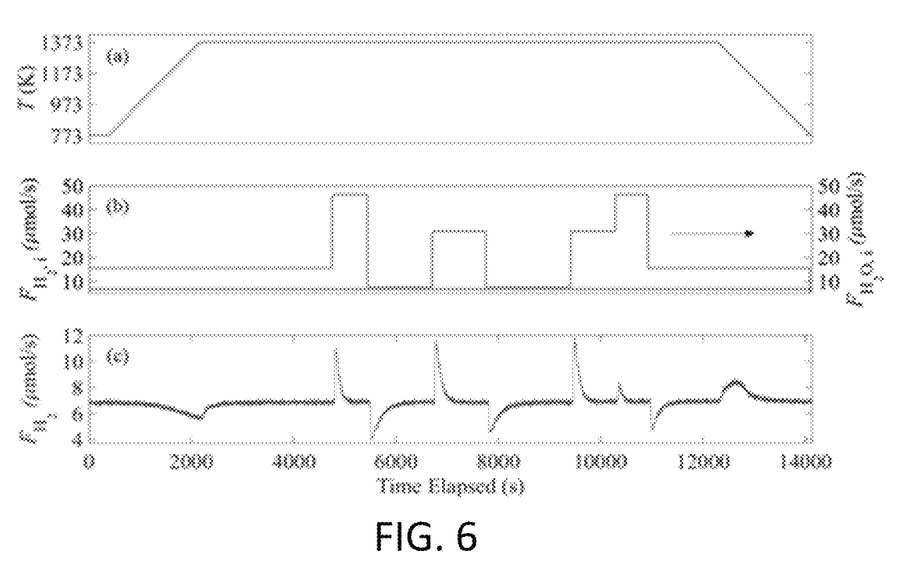
FIG. 6 illustrates exemplary experimental data in which the oxidation state of a ceria sample was cycled by shifting the $pO_2$ via step changes in the input $H_2O$ flow rate. (a) Reactor temperature versus time elapsed. (b) Input $H_2$ molar flow rate (left vertical axis) and input $H_2O$ molar flow rate (right vertical axis) versus time elapsed. (c) $H_2$ molar flow rate in the reactor effluent, as measured by the mass spectrometer, versus time elapsed.

Experiments to date have been performed with $H_2O/H_2/Ar$ mixtures to study the $H_2O$ splitting and $H_2$ oxidation relaxation rates over ceria. Here, all experiments were performed with a total pressure of 1 atm. FIG. 6 shows exemplary data alongside experimental conditions obtained with pure ceria for an experiment performed at 1373 K. Here, the sample (approximately 2.0 g) was initially reduced by heating from 773 to 1373 K at a rate of 20 K min$^{-1}$ with $pH_2O:pH_2=2.25$. At 1373 K and the flow conditions described, the $pO_2$ was $4.83 \times 10^{-13}$ atm and $\delta_f$ was 0.0679. Following equilibration, several reduction and oxidation reactions were initiated by varying the $H_2O$ input between $pH_2O:pH_2$ from 1.12-6.75 at 1373 K; in doing so, a maximum $\delta$ of 0.0908 ($pO_2=1.21 \times 10^{-13}$) and a minimum $\delta$ of 0.0334 ($pO_2=4.35 \times 10^{-12}$) were measured. Following the series of isothermal reactions, the sample was completely re-oxidized by cooling to 773 K under the same flow conditions as utilized during the initial nonisothermal reduction reaction.

Figure 7:
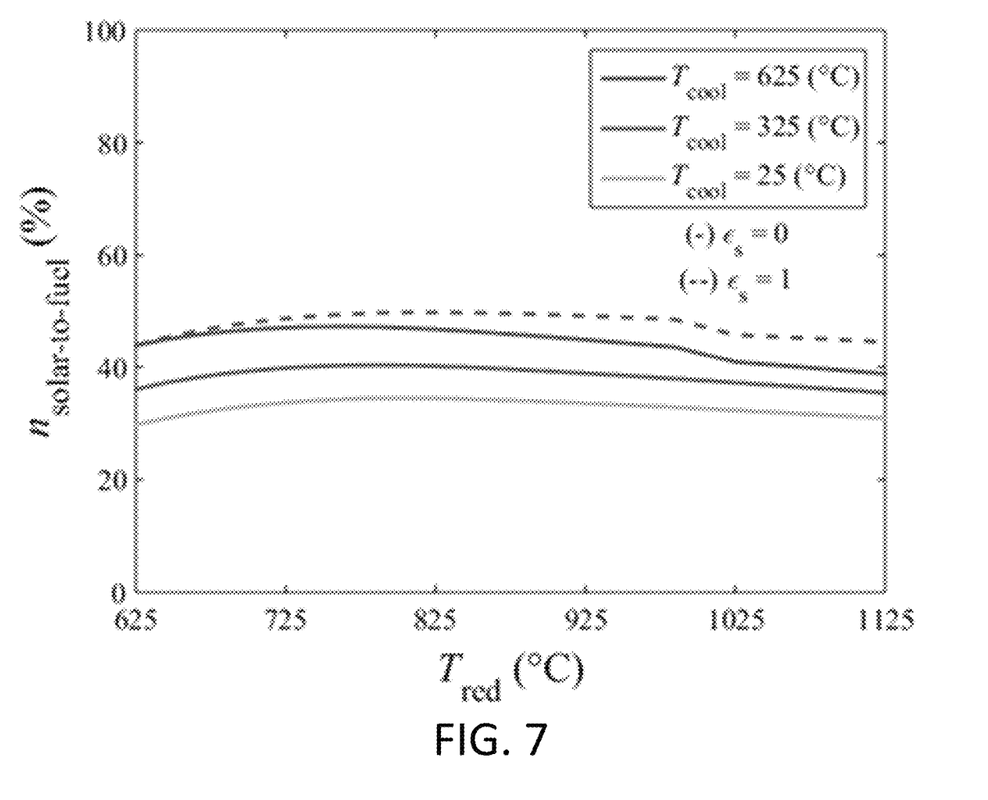
FIG. 7 illustrates the theoretical $\eta_{solar-to-fuel}$ as a function of increasing reduction temperature $T_{red}$ and different cooling temperatures $T_{cool}$. The dashed lines indicate perfect solid-phase heat recuperation; gas-phase heat recuperation was not considered. The conditions for each considered scenario are as follows: $T_{ox}=625°$ C., $n_{i,CH4}=0.5$ mol$_{CH4}$ mol$_{CeO2}^{-1}$, $n_{i,CO2}=3$ mol$_{CO2}$ mol$_{CeO2}^{-1}$, and $P_{system}=1$ bar.

We have performed solar to fuel conversion efficiency calculations ($\eta_{solar-to-fuel}$) for the proposed methane driven redox cycle. The main concern is the effect of the energetic penalty associated with cooling the particles below the oxidation temperature so that they may be transported to the flue gas reactor; in a typical redox process the particles would not be cooled below the oxidation temperature in order to limit the amount of sensible heat needed to reach the reduction temperature[27, 37]. Shown below in FIG. 7 is the predicted efficiency as a function of reduction temperature, for three different cooling temperatures (i.e. temperature at which particles are cooled and then transported to the flue gas reactor). Here, the oxidation temperature is assumed to be 625° C., and the efficiency (and other assumptions) is as we have defined in a prior publication[27] as the heating value of the synthesis products produced minus the heating value of methane supplied, all divided by the solar power input. As seen, the expected efficiency, even when cooling particles to ambient temperature (yellow curve), is predicted to be greater than 30% over all conditions considered. As expected, the efficiency increases if the particles are not cooled all the way to ambient temperature (and if solid-solid heat recuperation is integrated, blue dashed curve), but for the sake of being economically viable it is typically assumed that the process should be capable of achieving a 20% solar to fuel energy conversion efficiency or higher.[41, 49, 52]

REFERENCE FOR EXAMPLE 1

1. (IEA), I. E. A. *Power Generation from Coal: Measuring and Reporting Efficiency Performance and $CO_2$ Emissions*; 2010.
2. Welte, M.; Warren, K.; Scheffe, J. R.; Steinfeld, A., Combined ceria reduction and methane reforming in a solar-driven particle-transport reactor. *Industrial & engineering chemistry research* 2017, 56, (37), 10300-10308.
3. Wood, D. A.; Nwaoha, C.; Towler, B. F., Gas-to-liquids (GTL): A review of an industry offering several routes for monetizing natural gas. *Journal of Natural Gas Science and Engineering* 2012, 9, 196-208.
4. Mehos, M.; Turchi, C.; Jorgenson, J.; Denholm, P.; Ho, C.; Armijo, K. *On the Path to SunShot. Advancing Concentrating Solar Power Technology, Performance, and Dispatchability*; National Renewable Energy Lab. (NREL), Golden, Col. (United States): 2016.
5. Rostrup-Nielsen, J.; Sehested, J.; Nørskov, J. K., Hydrogen and synthesis gas by steam- and CO 2 reforming. In *Advances in catalysis*, 2002.
6. Pakhare, D.; Spivey, J., A review of dry (CO 2) reforming of methane over noble metal catalysts. *Chemical Society Reviews* 2014, 43, (22), 7813-7837.
7. York, A. P.; Xiao, T.; Green, M. L., Brief overview of the partial oxidation of methane to synthesis gas. *Topics in Catalysis* 2003, 22, (3-4), 345-358.
8. Wilhelm, D.; Simbeck, D.; Karp, A.; Dickenson, R., Syngas production for gas-to-liquids applications: technologies, issues and outlook. *Fuel processing technology* 2001, 71, (1), 139-148.
9. Pen, M.; Gomez, J.; Fierro, J. G., New catalytic routes for syngas and hydrogen production. *Applied Catalysis A: General* 1996, 144, (1-2), 7-57.
10. Enger, B. C.; Lødeng, R.; Holmen, A. A review of catalytic partial oxidation of methane to synthesis gas with emphasis on reaction mechanisms over transition metal catalysts. *Applied Catalysis A: General* 2008, 346, (1), 1-27.
11. Agrafiotis, C.; von Storch, H.; Roeb, M.; Sattler, C., Solar thermal reforming of methane feedstocks for hydrogen and syngas production—a review. *Renewable and Sustainable Energy Reviews* 2014, 29, 656-682.
12. Sheu, E. J.; Mokheimer, E. M.; Ghoniem, A. F., A review of solar methane reforming systems. *International Journal of Hydrogen Energy* 2015, 40, (38), 12929-12955.
13. Krenzke, P. T.; Fosheim, J. R.; Davidson, J. H., Solar fuels via chemical-looping reforming. *Solar Energy* 2017.
14. Steinfeld, A., Solar thermochemical production of hydrogen—a review. *Solar energy* 2005, 78, (5), 603-615.
15. Dry, M. E., The fischer-tropsch process: 1950-2000. *Catalysis today* 2002, 71, (3), 227-241.
16. Steinfeld, A.; Palumbo, R., Solar Thermochemical Process Technology. In R. A. Meyers Ed., Academic Press: 2001; Vol. 15, pp 237-256.

17. Panlener, R.; Blumenthal, R.; Garnier, J., A thermodynamic study of nonstoichiometric cerium dioxide. *Journal of Physics and Chemistry of Solids* 1975, 36, (11), 1213-1222.
18. Mogensen, M.; Sammes, N. M.; Tompsett, G. A., Physical, chemical and electrochemical properties of pure and doped ceria. *Solid State Ionics* 2000, 129, (1), 63-94.
19. Chueh, W. C.; Haile, S. M., A thermochemical study of ceria: exploiting an old material for new modes of energy conversion and CO2 mitigation. *Philosophical Transactions of the Royal Society of London A: Mathematical, Physical and Engineering Sciences* 2010, 368, (1923), 3269-3294.
20. Rhodes, N. R.; Bobek, M. M.; Allen, K. M.; Hahn, D. W., Investigation of long term reactive stability of ceria for use in solar thermochemical cycles. *Energy* 2015, 89, 924-931.
21. Skorodumova, N.; Simak, S.; Lundqvist, B. I.; Abrikosov, I.; Johansson, B., Quantum origin of the oxygen storage capability of ceria. *Physical Review Letters* 2002, 89, (16), 166601.
22. Furler, P.; Scheffe, J.; Gorbar, M.; Moes, L.; Vogt, U.; Steinfeld, A., Solar thermochemical $CO_2$ splitting utilizing a reticulated porous ceria redox system. *Energy & Fuels* 2012, 26, (11), 7051-7059.
23. Marxer, D.; Furler, P.; Scheffe, J.; Geerlings, H.; Falter, C.; Batteiger, V.; Sizmann, A.; Steinfeld, A., Demonstration of the Entire Production Chain to Renewable Kerosene via Solar Thermochemical Splitting of $H_2O$ and $CO_2$. *Energy & Fuels* 2015, 29, (5), 3241-3250.
24. Marxer, D.; Furler, P.; Takacs, M.; Steinfeld, A., Solar thermochemical splitting of CO 2 into separate streams of CO and O 2 with high selectivity, stability, conversion, and efficiency. *Energy & Environmental Science* 2017.
25. Diver, R. B.; Miller, J. E.; Allendorf, M. D.; Siegel, N. P.; Hogan, R. E., Solar thermochemical water-splitting ferrite-cycle heat engines. *Journal of Solar Energy Engineering* 2008, 130, (4), 041001.
26. Ermanoski, I.; Siegel, N. P.; Stechel, E. B., A new reactor concept for efficient solar-thermochemical fuel production. *Journal of Solar Energy Engineering* 2013, 135, (3), 031002.
27. Warren, K. J.; Reim, J.; Randhir, K.; Greek, B.; Carrillo, R.; Hahn, D. W.; Scheffe, J. R., Theoretical and Experimental Investigation of Solar Methane Reforming through the Nonstoichiometric Ceria Redox Cycle. *Energy Technology* 2017, 5, (11), 2138-2149.
28. Warren, K. J.; Scheffe, J. R., Kinetic insights into the reduction of ceria facilitated via the partial oxidation of methane. *Materials Today Energy* 2018, 9, 39-48.
29. Krenzke, P. T.; Davidson, J. H., Thermodynamic Analysis of Syngas Production via the Solar Thermochemical Cerium Oxide Redox Cycle with Methane-Driven Reduction. *Energy & Fuels* 2014, 28, (6), 4088-4095.
30. Yurek, G. J.; Hirth, J. P.; Rapp, R. A., The formation of two-phase layered scales on pure metals. *Oxidation of Metals* 1974, 8, (5), 265-281.
31. Kodama, T.; Shimizu, T.; Satoh, T.; Nakata, M.; Shimizu, K.-I., Stepwise production of CO-rich syngas and hydrogen via solar methane reforming by using a Ni (II)-ferrite redox system. *Solar Energy* 2002, 73, (5), 363-374.
32. He, F.; Trainham, J.; Parsons, G.; Newman, J. S.; Li, F., A hybrid solar-redox scheme for liquid fuel and hydrogen coproduction. *Energy & Environmental Science* 2014, 7, (6), 2033-2042.
33. Takenaka, S.; Dinh Son, V. T.; Otsuka, K., Storage and supply of pure hydrogen from methane mediated by modified iron oxides. *Energy & fuels* 2004, 18, (3), 820-829.
34. Takenaka, S.; Hanaizumi, N.; Otsuka, K., Production of pure hydrogen from methane mediated by the redox of Ni- and Cr-added iron oxides. *Journal of Catalysis* 2004, 228, (2), 405-416.
35. Scheffe, J. R.; Steinfeld, A., Oxygen exchange materials for solar thermochemical splitting of H2O and CO2: a review. *Materials Today* 2014, 17, (7), 341-348.
36. Panlener, R. J.; Blumenthal, R. N.; Garnier, J. E., A thermodynamic study of nonstoichiometric cerium dioxide. *Journal of Physics and Chemistry of Solids* 1975, 36, (11), 1213-1222.
37. Marxer, D.; Furler, P.; Takacs, M.; Steinfeld, A., Solar thermochemical splitting of CO2 into separate streams of CO and O2 with high selectivity, stability, conversion, and efficiency. *Energy & Environmental Science* 2017, 10, (5), 1142-1149.
38. Chueh, W. C.; Haile, S. M., Ceria as a Thermochemical Reaction Medium for Selectively Generating Syngas or Methane from H2O and CO2. *ChemSusChem* 2009, 2, (8), 735-739.
39. Chueh, W. C.; Falter, C.; Abbott, M.; Scipio, D.; Furler, P.; Haile, S. M.; Steinfeld, A., High-Flux Solar-Driven Thermochemical Dissociation of CO2 and H2O Using Nonstoichiometric Ceria. *Science* 2010, 330, (6012), 1797-1801.
40. Furler, P.; Scheffe, J. R.; Steinfeld, A., Syngas production by simultaneous splitting of H2O and CO2via ceria redox reactions in a high-temperature solar reactor. *Energy & Environmental Science* 2012, 5, (3), 6098-6103.
41. Stechel, E. B.; Miller, J. E., Re-energizing CO2 to fuels with the sun: Issues of efficiency, scale, and economics. *Journal of CO2 Utilization* 2013, 1, 28-36.
42. Riviere, M.; Missault, D.; Mauvais, P.; Carre, M.; Jacksier, T. *Oxycombustion Flue Gas Measurements from Coal Fired Plants: Analytical Challenges;* 2015.
43. Ermanoski, I.; Grobbel, J.; Singh, A.; Lapp, J.; Brendelberger, S.; Roeb, M.; Sattler, C.; Whaley, J.; McDaniel, A.; Siegel, N. P. In *Design and construction of a cascading pressure reactor prototype for solar-thermochemical hydrogen production,* 2016, AIP Publishing: p 120001.
44. Scheffe, J. R.; Welte, M.; Steinfeld, A., Thermal reduction of ceria within an aerosol reactor for H2O and CO2 splitting. *Industrial & Engineering Chemistry Research* 2014, 53, (6), 2175-2182.
45. Scheffe, J. R.; Jacot, R.; Patzke, G. R.; Steinfeld, A., Synthesis, Characterization, and Thermochemical Redox Performance of Hf4+, Zr4+, and Sc3+ Doped Ceria for Splitting CO2. *The Journal of Physical Chemistry C* 2013, 117, (46), 24104-24114.
46. Takacs, M.; Scheffe, J. R.; Steinfeld, A., Oxygen nonstoichiometry and thermodynamic characterization of Zr doped ceria in the 1573-1773 K temperature range. *Physical Chemistry Chemical Physics* 2015, 17, (12), 7813-7822.
47. Hao, Y.; Yang, C.-K.; Haile, S. M., Ceria-Zirconia Solid Solutions (Ce1-x Zr x O2-δ, x≤0.2) for Solar Thermochemical Water Splitting: A Thermodynamic Study. *Chemistry of Materials* 2014, 26, (20), 6073-6082.
48. York, A. P. E.; Xiao, T.; Green, M. L. H., Brief overview of the partial oxidation of methane to synthesis gas. *Topics in Catalysis* 2003, 22, (3-4), 345-358.
49. Kim, J.; Henao, C. A.; Johnson, T. A.; Dedrick, D. E.; Miller, J. E.; Stechel, E. B.; Maravelias, C. T., Methanol 50. Kim, J.; Miller, J. E.; Maravelias, C. T.; Stechel, E. B., Comparative analysis of environmental impact of S2P (Sunshine to Petrol) system for transportation fuel production. *Applied Energy* 2013, 111, 1089-1098.
51. Welte, M.; Barhoumi, R.; Zbinden, A.; Scheffe, J. R.; Steinfeld, A., Experimental Demonstration of the Thermochemical Reduction of Ceria in a Solar Aerosol Reactor. *Industrial & Engineering Chemistry Research* 2016, 55, (40), 10618-10625.
52. Siegel, N. P.; Miller, J. E.; Ermanoski, I.; Diver, R. B.; Stechel, E. B., Factors Affecting the Efficiency of Solar Driven Metal Oxide Thermochemical Cycles. *Industrial & Engineering Chemistry Research* 2013, 52, (9), 3276-3286.
53. Trachtenberg, M. C.; Smith, D. A.; Cowan, R. M.; Wang, X. In *Flue gas CO2 capture by means of a biomimetic facilitated transport membrane*, 2007.
54. Scheffe, J. R.; McDaniel, A. H.; Allendorf, M. D.; Weimer, A. W., Kinetics and mechanism of solar-thermochemical H2 production by oxidation of a cobalt ferrite-zirconia composite. *Energy & Environmental Science* 2013, 6, (3), 963-973.
55. Hofstetter, D. Economic Viability and Environmental Impact of Solar-Thermochemical Fuels. University of Oxford, 2011.

We claim the following:

1. A method of continuously processing flue gas, comprising:
   a) introducing a flue gas comprising $CO_2$, $H_2O$, $O_2$, $N_2$, $SO_x$, and $NO_2$ to a reduced solid oxide material, wherein the reduced material is in a fluidized bed reactor, wherein $CO_2$ is not stored during this process;
   b) forming a first gas mixture comprising CO, $H_2$, $N_2$, $SO_x$, and $NO_2$ by performing a reduction reaction of the flue gas with the reduced solid oxide material, wherein the reduced solid oxide material is oxidized to form an oxidized solid material, wherein step b) is conducted in the fluidized bed reactor;
   c) separating the first gas mixture from the oxidized solid material, wherein the oxidized solid material is transferred from the fluidized bed reactor to a solar drop-tube reactor;
   d) introducing the oxidized solid material to a reducing environment;
   e) forming a second gas mixture by reducing the oxidized solid material to form the reduced solid oxide material, wherein step e) is conducted in the solar drop-tube reactor, wherein reduction includes using a solar radiation heat source and the solar drop-tube reactor has low partial pressure of oxygen ($pO_2$);
   f) separating the second gas mixture from the reduced solid oxide material, wherein the reduced solid oxide material reduced is transferred to the fluidized bed reactor; and
   g) go to step a) to continuously process the flue gas, wherein steps a) and b) and d) and e) are decoupled from one another.

2. The method of claim 1, wherein the low $pO_2$ is achieved via vacuum pumping, rendering the second gas mixture as comprising $O_2$.

3. The method of claim 1, wherein the low $pO_2$ is achieved via an inert gas, rendering the second gas mixture as comprising $O_2$ and the inert gas.

4. The method of claim 1, wherein the low $pO_2$ is achieved via a fuel source, rendering the second gas mixture as comprising CO and $H_2$.

5. The method of claim 1, wherein the low $pO_2$ is achieved via a fuel mixture containing methane, rendering the second gas mixture as comprising CO and $H_2$.

6. The method of claim 1, wherein the reduced solid oxide material has partial molar enthalpy ($\Delta h_o$), or enthalpy of reaction with gaseous $O_2$ that is greater than the magnitude of formation enthalpies of $H_2O$ ($\Delta h_{f,H2O}$) and $CO_2$ ($\Delta h_{f,CO2}$).

7. The method of claim 1, wherein the reduced solid oxide is $M(1)O_{2-\delta}$ and $\delta$ is $M(1)O_2$ nonstoichiometry, wherein $0<\delta\leq0.5$, wherein $M(1)$ is Ce.

8. The method of claim 1, wherein the reduced solid oxide is $M(3)_xCe_{1-x}O_{2-\delta}$, wherein $M(3)$ is La.

9. The method of claim 1, wherein the reduced solid oxide is $M(3)_xCe_{1-x}O_{2-\delta}$, wherein $M(3)$ is Cr.

10. The method of claim 1, wherein the reduced solid oxide is $M(3)_xCe_{1-x}O_{2-\delta}$, wherein $M(3)$ is Al.

11. The method of claim 1, wherein the reduced solid oxide is $M(3)_xCe_{1-x}O_{2-\delta}$, wherein $M(3)$ is Sr.

12. The method of claim 1, wherein the reduced solid oxide is $M(3)_xCe_{1-x}O_{2-\delta}$, wherein $M(3)$ is Co.

13. The method of claim 1, wherein the reduced solid oxide is $M(3)_xCe_{1-x}O_{2-\delta}$, wherein $M(3)$ is Fe.

14. The method of claim 1, wherein the reduced solid oxide is $M(1)_xM(2)_{1-x}O_{2-\delta}$.

15. The method of claim 1, further comprising:
    processing the first gas mixture and second gas mixture to form a third gas mixture that includes $N_2$; and
    processing the third gas mixture to form a hydrocarbon liquid fuel.

16. The method of claim 1, wherein the reduced solid oxide is $M(1)_xM(2)_{1-x}O_{2-\delta}$ or $M(3)_xCe_{1-x}O_{2-\delta}$; wherein when the solid oxide is $M(1)_xM(2)_{1-x}O_{2-\delta}$, $\delta$ is $M(1)O_2$ nonstoichiometry, wherein x is greater than 0 and up to 0.5, wherein $0<\delta\leq2$, wherein $M(2)$ is Hf, wherein $M(1)$ is Ce, wherein when the solid oxide is $M(3)_xCe_{1-x}O_{2-\delta}$, $\delta$ is $CeO_2$ nonstoichiometry, wherein x is greater than 0 and up to 0.5, and $\delta$ is $CeO_2$ nonstoichiometry, wherein $0<\delta\leq2$, wherein M3) is selected from La, Cr, Al, Sr, Co, or Fe.

* * * * *